United States Patent
Edden et al.

[11] 3,835,378
[45] Sept. 10, 1974

[54] SYSTEM FOR AUTOMATIC GAIN MEASUREMENT

[75] Inventors: Francis E. Edden, Huntington; Joseph P. Engeman, East Northport, both of N.Y.

[73] Assignee: Cutler-Hammer Inc., Milwaukee, Wis.

[22] Filed: Dec. 17, 1973

[21] Appl. No.: 425,601

[52] U.S. Cl............... 324/57 R, 324/57 N, 325/363
[51] Int. Cl............................................. G01r 27/00
[58] Field of Search......... 324/57 R, 57 N; 325/363, 325/133; 178/DIG. 4, DIG. 12

[56] References Cited
UNITED STATES PATENTS
3,619,780   11/1971   Hocks et al.................... 324/57 N X
3,737,781   6/1973   Deerkoski et al.................. 325/363

*Primary Examiner*—Stanley T. Krawczewicz
*Attorney, Agent, or Firm*—Henry Huff; Kevin Redmond

[57] ABSTRACT

An automatic measurement of gain is made with an automatic noise figure indicator by adapting the indicator to take the quotient of two parameters of the device under test. Signals representing these parameters are inherently available within the automatic noise figure indicator and can be used for the measurement of gain without affecting the simultaneous measurement of noise figure.

10 Claims, 4 Drawing Figures

SYSTEM FOR AUTOMATIC GAIN MEASUREMENT

BACKGROUND

1. Field

This invention relates to a system for adapting an automatic noise figure indicator, such as used for testing radio receivers and amplifiers, to provide an automatic measurement of gain. 2. Prior Art Noise figure indicators which can be adapted for use with the invention are illustrated by the following U.S. Pat. Nos. 3,506,915, Harris et al., Apr. 14, 1970; 2,620,438, Cotsworth, Dec. 2, 1952; 2,901,696, Mollfors, Aug. 1959. 1959. These patents describe noise figure indicators in which a noise generator, having known or predetermined output characteristics, is cyclically switched on and off, causing the device under test to produce noise output alternately at two different power levels. The noise figure of the device under test is determined from a mathematical relationship between the two levels and is indicated on a meter. None of these patents disclose any provision for the measurement of gain. In the past, the measurement of gain has been carried out on equipment completely separate from that used for the measuremet of noise figure. Often several nonautomatic test instruments were necessary, requiring a considerably longer time for setup and measurement than would be required with a single automatic instrument.

SUMMARY

Gain is equal to the noise power output divided by the noise figure of the device under test. In a preferred embodiment of this invention, signal levels proportional to the logarithms of device noise power output and noise figure are produced in logarithmic function generators and are then subtracted to produce a signal which is proportional to the logarithm of gain.

An automatic gain control system often used within the noise figure indicator provides a function which closely approximates a logarithmic function of noise power output, thereby reducing the amount of circuitry necessary for the measurement of gain.

DESCRIPTION OF THE PREFERRED EMBODIMENT

Figure 1:
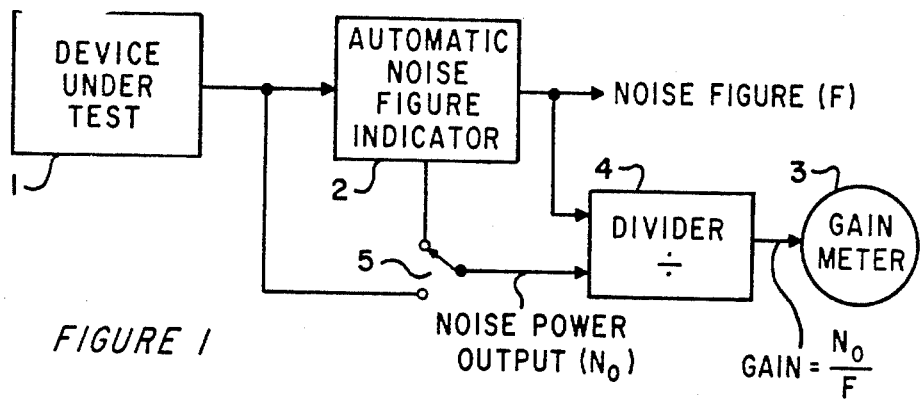
FIG. 1 is a block diagram of a system used to measure gain in accordance with the present invention.
Figure 2:
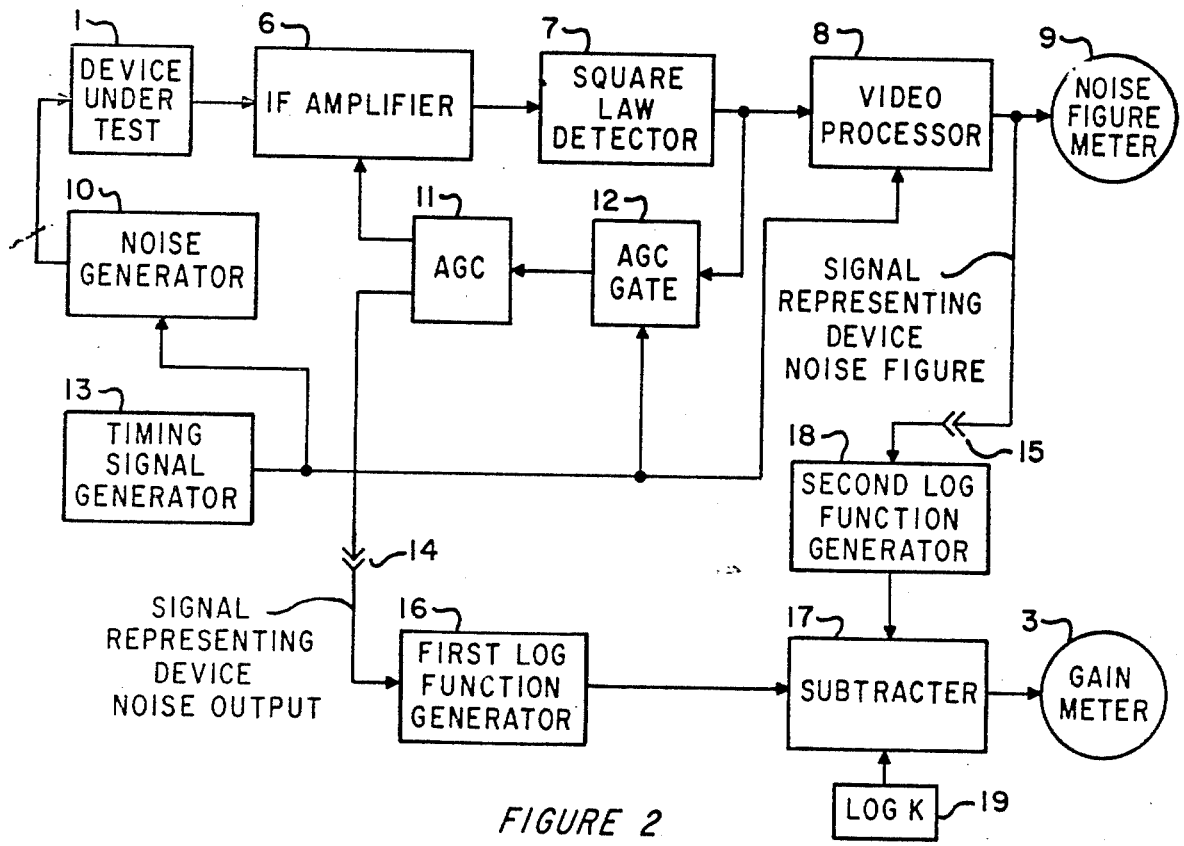
FIG. 2 is a block diagram of an automatic noise figure indicator system adapted to measure gain in accordance with the present invention.

The gain measurement system of FIG. 1 consists of a device under test 1, an automatic noise figure indicator 2 connected to the device under test, and a divider 4 which accepts as one input the noise figure of the device under test from the output of noise figure indicator and, as a second input, the noise power output of the device under test obtained either from the automatic noise figure indicator or from the device under test, depending upon the position of selector switch 5. The divider produces at its output port a signal proportional to the noise power output divided by noise figure. The output of the divider is a signal proportional to the gain of the device under test and is supplied to a gain indication meter 3.

a noise figure indicator, shown in the upper portion of FIG. 2, is connected at points 14 and 15 to gain measurement circuitry shown in the lower portion of this figure. The automatic noise figure indicator is comprised of a noise generator 10, a timing signal generator 13 arranged to cyclically turn the noise generator on and off, an I-F amplifier 6, a square law detector 7, a video processor 8 and a noise figure meter 9.

The amplifier 6 is provided with an automatic gain control (AGC) 11 which is coupled to the output of detector 7 through a gate circuit 12. Gate 12 is arranged to pass a signal each time the noise generator is shut off in accordance with a control signal from timing generator 13.

The output of the square law detector 7 is coupled to the signal input circuit of the video processor 8. The video processor also receives a control signal from timing generator 13 and contains a circuit which produces a signal representing the noise figure of the device under test in response to two voltages alternately produced at the output of the detector as a result of the noise source switching cycle. The output of the video processor is supplied to the noise figure meter 9. Various circuits may be used i the video processor as illustrated by the synchronous detector in Harris, the peak reading voltmeter in Cotsworth and the gated amplifiers and quotient meter in Mollfors.

The gain measurement circuitry is comprised of a first logarithmic function generator 16, a second logarithmic function generator 18, a subtracter 17 and a gain indication meter 3. The first function generator 16 supplies a signal which is a logarithmic function of the output of the automatic gain control 11 to the subtracter 17, while the second function generator 18 performs the same function for a signal representing noise figure obtained from the output of the video processor 8. The output of the subtracter 17 is a signal representing gain which is supplied to the gain indication meter 3.

Noise figure is defined as the ratio of the noise power available at the output of a device, when the input termination is at a standard reference temperature of 290° K, to that portion of the total available output noise power originating in the termination. This relationship is expressed in the following equation:

$$F = N_{Do}/G_D N_R$$

where

F is the noise figure of the device under test, $N_{Do}$ is the noise power output of the device under test, $N_R$ is the noise power available from the termination at 290°, and $G_D$ is the gain of the device under test.

By rearrangement of the above equation, the gain of the device under test may be expressed in terms of the noise power output divided by the noise figure.

$$G_D = N_{Do}/F N_R = K\, N_{Do}/F$$

where

K is a constant equal to the reciprocal of $N_R$.

It is assumed that $N_R$ is a constant when the termination is maintained at a constant temperature.

A signal related to noise figure may be obtained from the output of the noise figure indicator at point 15 in FIG. 2, while a signal related to noise power output may be obtained from the AGC circuit at point 14 in FIG. 2. The output of the AGC is a function only of the noise power output as signals from other sources are excluded by gate 12. The operation of gate 12 is similar to that of the AGC gates in Harris and Cotsworth.

Division of noise power output by noise figure is computed by taking the logarithm of these functions in logarithmic function generators 16 and 18 and subtracting the two in subtracter 17. This process can be expressed as follows:

$$G_D = K N_{Do}/F$$

$$\log G_D = \log K + \log N_{Do} - \log F$$

The voltage produced at the output of the subtracter is a logarithmic function of the gain of the device under test and is used to supply gain indication meter 3, providing a measurement of gain in dB on a linearly graduated meter. All of the inputs to the subtracter are in the form of dc voltages. Two of these voltages are supplied by the logarithmic function generators while the third, which represents log K, is supplied by a dc voltage source 19. The voltage representing log K is a known function of the termination resistance and the operating temperature and is typically set for standard values of these parameters such as 50 ohms and 290° K.

A type of noise figure indicator that produces a signal which represents the reciprocal of noise figure, rather than noise figure directly, may be adapted to measure gain by using a system similar to that shown in FIG. 2. The only change required is the substitution of an adder for subtracter 17. Processing for this type of noise figure indicator is expressed in the following equation:

$$G_D = K N_{Do}/F$$

$$\log G_D = \log K + \log N_{Do} + \log 1/F$$

In an analog system, the logarithmic function generator is usually a logarithmic amplifier, the subtracter is a differential amplifier and the meter is a conventional milliammeter; however, in a digital system, these components are replaced by a digital logarithmic function generator, a digital subtracter and a digital readout.

Figure 3:
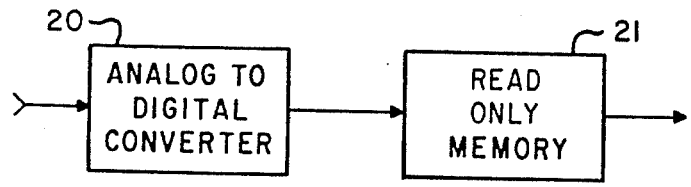
FIG. 3 is a block diagram of a first type of digital logarithmic function generator which may be used with the system of FIG. 2.
Figure 4:
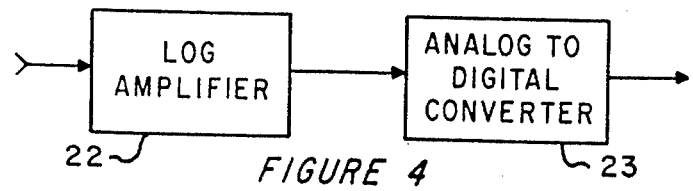
FIG. 4 is a block diagram of a second type of digital logarithmic function generator which may be used with the system of FIG. 2.

Two types of digital logarithmic function generators are shown in FIGS. 3 and 4. In the digital logarithmic function generator of FIG. 3, an analog to digital converter (A/D) 20 feeds a read-only-memory (ROM) 21 programmed to produce a logarithmic output for a linear input. A device such as a ROM acts as a look-up table by producing a signal representing a function at its output port when a signal representing the argument of that function is supplied to its input port. In FIG. 4, a digital logarithmic output is produced by converting the input signal to a logarithmic function in a logarithmic amplifier 22. The amplifier output is then converted to digital form in an analog to digital converter 23.

Owing to the nature of AGC systems, the output of the automatic gain control 11 approximates a logarithmic function and therefore reduces the complexity of logarithmic function generator 16 for analog or digital gain measurement systems.

We claim:

1. A system for the measurement of gain comprising:
   a. an automatic noise figure indicator of the type which provides a first signal at its output representing the noise figure of the device under test,
   b. means for producing a second signal representing the noise power output of the device under test, and
   c. means responsive to said first and second signals to produce a third signal representing the quotient of said noise power output divided by said noise figure, and thereby the gain of said device under test.

2. A system as claimed in claim 1 including means for displaying a quantitative representation of said third signal in terms of the gain of the device under test.

3. A system as claimed in claim 1, wherein said noise figure indicator includes an amplifier and an automatic gain control for said amplifier, said amplifier being connected to the output of the device under test and said second signal being obtained from the output of said automatic gain control.

4. A system as claimed in claim 1, wherein said means responsive to said first and second signals comprises:
   a. a first logarithmic function generator having an input and an output port and receiving said first signal at its input port and producing at its output port a signal representing the logarithm of said first signal,
   b. a second logarithmic function generator having an input and output port and receiving said second signal at its input port producing at its output port a signal representing the logarithm of said second signal,
   c. a subtracter having a first and second input port and an output port, said subtracter receiving at the first input port the output signal from said first logarithmic function generator and, at the second input port, the output signal from said second logarithmic function generator, said first logarithmic output signal being subtracted from said second logarithmic output signal in said subtracter to produce a signal representing the gain of the device under test at the output port of said subtracter.

5. A system as claimed in claim 4, wherein said first and second logarithmic function generators are logarithmic amplifiers and said subtracter is a differential amplifier.

6. A system as claimed in claim 4, wherein said first and second logarithmic function generators are each comprised of an analog to digital converter connected to a read-only-memory which is adapted to produce a digital output signal which is a logarithmic representation of an input signal, and said subtracter is a digital subtracter.

7. A system as claimed in claim 4, wherein said first and second logarithmic function generators are each comprised of a logarithmic amplifier connected to an analog to digital converter, and said subtracter is a digital subtracter.

8. A system for the measurement of gain comprising:
   a. an automatic noise figure indicator of the type which provides a first signal at its output representing the reciprocal of the noise figure of the device under test, b. means for producing a second signal representing the noise power output of the device under test, and c. means responsive to said first and second signals to produce a third signal representing the product of said first and second signals, and thereby the gain of said device under test.

9. A system as claimed in claim 8, wherein said means responsive to said first and second signals comprises:

a. a first logarithmic function generator having an input and an output port and receiving said first signal at its input port and producing at its output port a signal representing the logarithm of said first signal, b. a second logarithmic function generator having an input and output port, and receiving said second signal at its input port and producing at its output port a signal representing the logarithm of said second signal, c. an adder having a first and second input port and an output port, said adder receiving at the first input port the output signal from said first logarithmic function generator and, at the second input port, the output signal from said second logarithmic function generator, said first logarithmic output signal being added to said second logarithmic output signal in said adder to produce a signal representing the gain of the device under test at the output port of said summer.

10. A method for the measurement of gain utilizing an automatic noise figure indicator which comprises:

a. producing a first signal from the automatic noise figure indicator which represents the noise figure of the device under test, b. producing a second signal which represents the noise power output of the device under test, and c. producing a third signal in response to said first and second signals which represents the quotient of said noise power output divided by said noise figure, and thereby the gain of the device under test.

* * * * *